United States Patent [19]

Kendall

[11] Patent Number: 4,635,189

[45] Date of Patent: Jan. 6, 1987

[54] REAL-TIME DISTRIBUTED DATA-BASE MANAGEMENT SYSTEM

[75] Inventor: Burton Kendall, Saratoga, Calif.

[73] Assignee: Measurex Corporation, Cupertino, Calif.

[21] Appl. No.: 585,003

[22] Filed: Mar. 1, 1984

[51] Int. Cl.⁴ .............................................. G06F 12/00
[52] U.S. Cl. ..................................... 364/200; 364/300
[58] Field of Search ... 364/200 MS File, 900 MS File, 364/300

[56] References Cited

U.S. PATENT DOCUMENTS

| | | | |
|---|---|---|---|
| 4,007,450 | 2/1977 | Haibt et al. | 364/200 |
| 4,215,407 | 7/1980 | Gomola et al. | 364/200 X |
| 4,274,139 | 6/1981 | Hodgkinson et al. | 364/200 |
| 4,333,144 | 6/1982 | Whiteside et al. | 364/200 |
| 4,412,285 | 10/1983 | Neches et al. | 364/200 |
| 4,432,057 | 2/1984 | Daniell et al. | 364/200 |

Primary Examiner—Raulfe B. Zache
Assistant Examiner—Florin Munteanu
Attorney, Agent, or Firm—Spensley Horn Jubas & Lubitz

[57] ABSTRACT

A real-time distributed data-base system that stores in the local memory of each processor copies of only those variables necessary for execution of the programs in that processor. Performance is enhanced by using the absolute address of variables in each program reference, with automatic updating of all program references when the location of variables are changed. Flexibility in user application programming is enhanced by permitting combination and conditional updates of variables through the interaction of multiple processors.

16 Claims, 4 Drawing Figures

REAL-TIME DISTRIBUTED DATA-BASE MANAGEMENT SYSTEM

BACKGROUND OF THE INVENTION

1. Field of the Invention

This invention relates to a data-base management software system, and in particular to an improved real-time distributed data-base management system configured for high-speed operation.

2. Prior Art

A data-base management system (DBMS) is a generalized software system designed to provide facilities for data base organization, access, and control. A data base is a collection of logically organized information intended for access by multiple users. The data base constitutes the collective requirements of all users. However, any individual user would typically require access to only a portion of the entire data base.

In a distributed data processing system having multiple computer processors, a general problem arises as to the most efficient organization of the data base and optimum procedures for accessing that data base while minimizing required system resources. The problem becomes particularly acute in real-time computer operating environments, such as are used to control manufacturing processes. In such an environment, various of the processors require access to data that is constantly changing, such as temperature, pressure, flow rate, and other manufacturing process parameters that are input into the computer processing system for evaluation and control of the manufacturing process.

FIG. 1 shows a block diagram of a typical multiple processor computer architecture used for real-time manufacturing process control. Each processor is coupled to a communications bus, which may be one of several communications bus types. Typically, in a real-time operating system, each local processor 2a . . . 2n receives data from or sends data to a number of subprocessors 3. The subprocessors 3 are coupled to sensors and/or actuators 4, for interaction with the manufacturing process. Often one processor will need data collected by another processor to update calculations used in the manufacturing process control. For example, one local processor may obtain temperature data on a portion of a manufacturing process. This temperature data must be used by a second processor in order to limit the rate of flow of material in another portion of the manufacturing process. However, it is rare that any one processor needs access to all of the data being collected by all of the processors in the system. Therefore, it would be wasteful of processing system resources to store duplicate copies of the complete data base in each local processor. Further, it would be wasteful of system communication resources to update each such data base in each processor whenever the data changes. Thus, it is advantageous to devise a data base architecture that provides access by one processing unit to data in another processing unit upon demand.

Some prior art systems have utilized a centralized data base in a main processor, which each local processor accesses as necessary to ascertain the current value of particular variables. However, this architecture is not very reliable, since a failure in the main processor may completely disrupt operation of the processing system as a whole. Examples of such prior art systems may be found in "Distributed Micro/Minicomputer Systems" by Cay Weitzman (Prentice-Hall, Inc. copyright 1980).

It is advantageous in a real-time computer processing system to permit each local processor to locally store and directly address data that is necessary in the operation of that processor. Such direct addressing permits improved performance by permitting the processor to fetch data from its local memory without having to calculate or otherwise locate the address of that information. Such local storage of necessary information is also advantageous in providing higher reliability for the system as a whole, since, by locally storing data acquired from another processor, no one processor is dependent upon the accessibility and reliability of a centralized data base. It is also advantageous to provide a real-time data base management system that permits automatic update of data used in a local processor but originally obtained from another processor.

Therefore, it is an object of the present invention to provide an improved real-time data base management system which minimizes the memory requirements of each local processor, provides high reliability by locally storing data used in each processor, and minimizes the amount of processing time incurred in transferring data from one processor to another processor.

SUMMARY OF THE INVENTION

The present invention provides a Block Builder procedure and a Real-Time Data Management procedure for locally storing in each processor a copy of each variable needed by the programs executed by that processor. Further, each reference by a program in a local processor to a variable is to a locally stored variable. Nonetheless, such reference is to the absolute address of the original of that variable, no matter where in the processing system the original of the variable is initially determined. The Real-Time Data Management procedure permits each copy of a variable to be updated by the current value of the original variable on a periodic basis or upon the occurrence of a defined condition. Further still, the Real-Time Data Management procedure permits great flexibility in data manipulation, including the ability to have a program in a first processor address an original variable in a second processor, and direct that the most current value for that variable then be stored in a third processor upon the occurrence of a designated condition in a fourth processor, with an acknowledgment signal sent to a fifth processor.

DETAILED DESCRIPTION OF THE INVENTION

Figure 1:
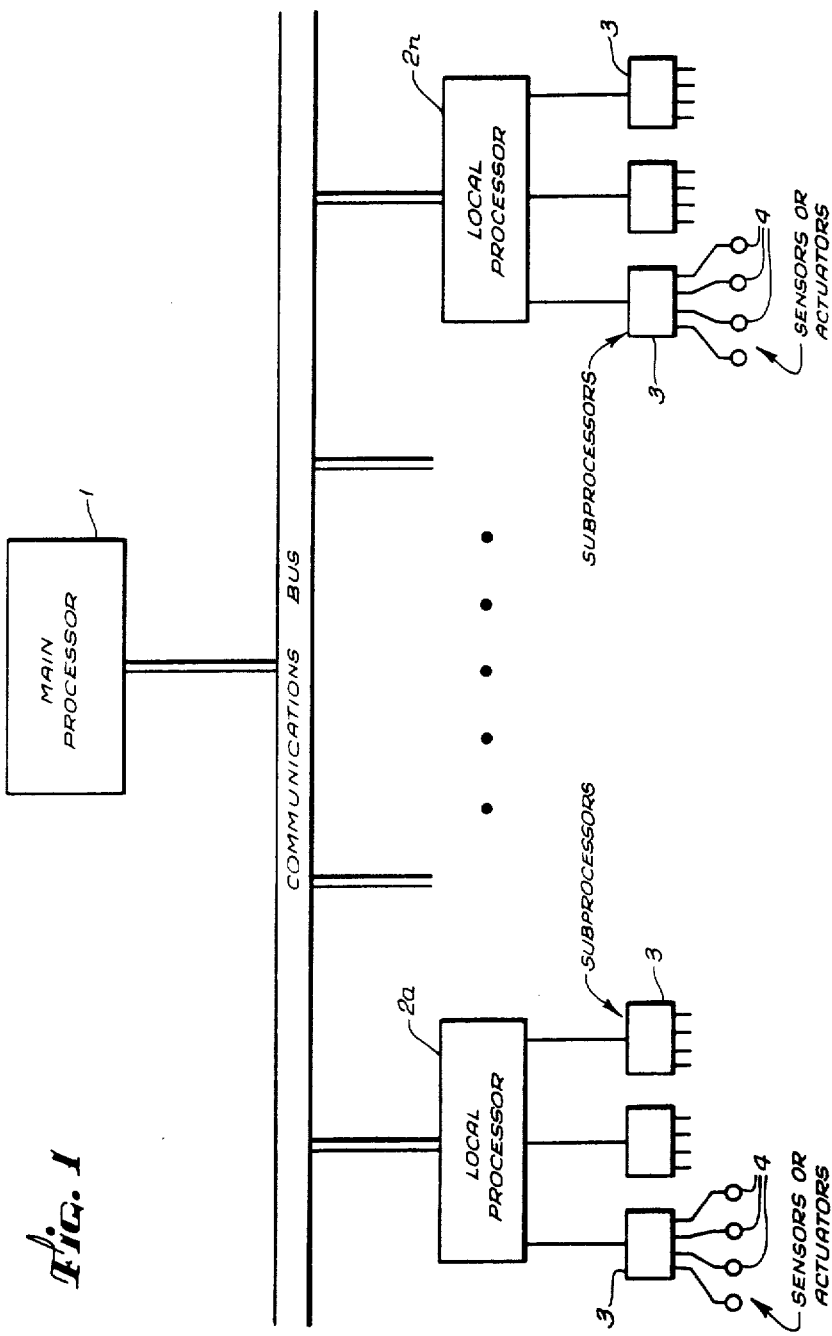
FIG. 1 is a block diagram of a real-time distributed processing computer system of the type that might be used to control a manufacturing process.

The present invention, in its preferred embodiment, is composed of two parts: a Block Builder procedure, and a Real-Time Data Management (RTDM) procedure. The Block Builder procedure is performed in a main computer processor, such as the main processor 1 shown in FIG. 1. As a prerequisite for operation of the invention, all programs designed to control procedures in the local processors (2a ... 2n, in FIG. 1) must be prepared through interaction with the Block Builder. However, the preparation of such user application programs may be done from any of the local processors by means of well-known remote communication procedures between a local processor and the main processor 1.

Figure 2:
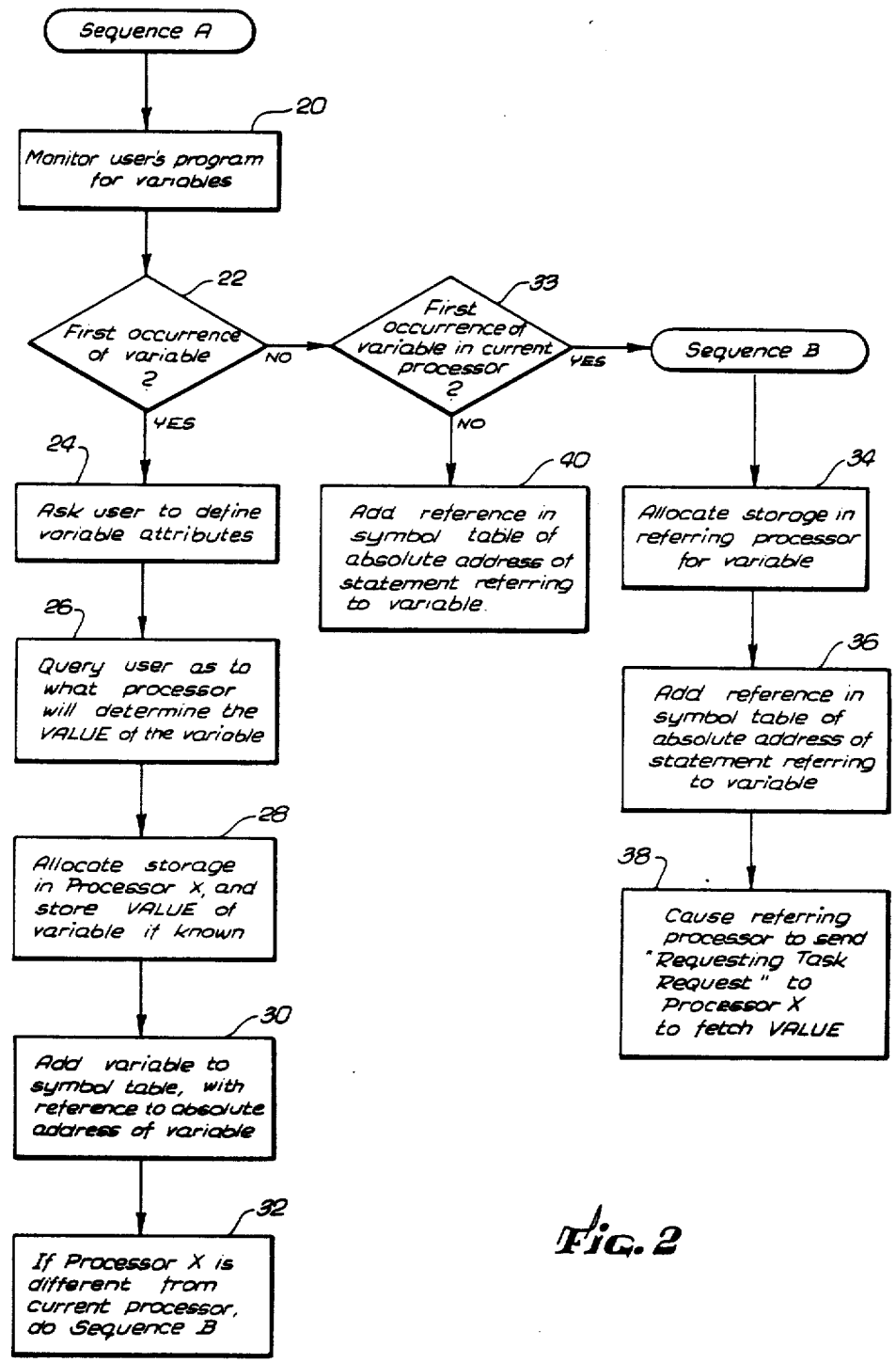
FIG. 2 is a flow-chart of the Block Builder procedure of the present invention.

FIG. 2 shows a block diagram of the procedure performed by the Block Builder. Sequence A constitutes the main procedure. As a user prepares an application program, the Block Builder monitors the program text for the occurrence of variable names (step 20). As each variable name is input by the user, it is tested against a master symbol table or list of variable names to see whether this occurrence is the very first occurrence of the variable (step 22). If so, the Block Builder procedure asks the user to define the attributes of the variable, such as its length, type, and default value (step 24). The Block Builder then queries the user as to what processor will supply the VALUE for the variable (step 26). This processor (denoted "X") is then accessed by the Block Builder and storage for the variable is allocated in that processor (step 28). Also, if a default value is known for the variable at that time, that VALUE is stored in Processor X.

Thereafter, the Block Builder enters the name of the new variable into a symbol table in the main processor, which is a master list of all variables used throughout the entire computer system (step 30). The symbol table entry for the new variable essentially consists of the name of the variable, the attributes of the variable, the absolute address of the variable in the processor where the VALUE of the variable will be determined, and a list of all the references in all programs throughout the system that refer to that variable.

The "absolute address" of a variable refers to the processor, and the memory location within that processor, in which the VALUE for that variable is initially stored upon determination by that processor. In actual practice, a relocatable "absolute" address is used, determined in any of several ways known in the prior art, in order to increase system flexibility and ease of operating system programming. By storing this absolute address for each variable, the Block Builder procedure and the RTDM procedure can directly access the current VALUE of the variable, rather than indirectly referencing that VALUE such as may be the case in prior art "look-up tables".

If the user has designated a processor other than the local processor upon which the program is being implemented as the source for the VALUE to be assigned to that variable, then Sequence B is performed (step 32). Further, if the outcome of the test in step 22 is that a variable designated by a user is not the very first occurrence of the variable, then the Block Builder tests to determine if the present occurrence is the first occurrence of the variable in the current processor (Step 33). If so, then Sequence B is also performed.

In Sequence B, shown in FIG. 2, the Block Builder allocates storage for a duplicate copy of the variable in the processor that will reference the original variable (step 34). The referring processor is distinguished from the processor in which the VALUE for the variable is determined in that any processor within the system may refer to a particular variable (and thus have space allocated in its local memory for a copy of that variable), but only one processor in the system actually determines the VALUE for that variable.

Two important aspects of the present invention are that storage space is allocated for a variable only in referring processors (rather than in all processors), and each program step in a program executed by a referring processor that references that variable is assigned the absolute address of the local duplicate copy of the variable. Thus, during the execution of any program that makes reference to a variable, the program may directly address the local copy of that variable, and through the RTDM procedure obtain a copy of the most current VALUE for that variable and store it in that address in the processor's local memory. In essence, each local processor stores in its local memory a copy of every variable used by the programs executed by that local processor. The values of these variables are automatically updated through the RTDM procedure at a rate specified by the user in each application program. Each program in each local processor references each variable by the absolute address of that variable in the processor's local memory. Further, the RTDM procedure references the absolute address of the original variable in the processor where the VALUE of the variable is determined. This speeds up execution of the program by eliminating the program steps that a look-up table or other indirect access method requires in determining the address or location of the current value for each desired variable.

As the next step in Sequence B, a reference is added into the master symbol table entry for the variable, indicating the absolute address of any command or other program line that refers to the particular variable (step 36). This is useful in system maintenance where, for example, the location of a variable in the processor that determines the VALUE of the variable is changed. If such a change occurs, the Block Builder may refer to the master symbol table and determine the absolute address of each and every reference to that variable in every program throughout the processing system. The Block Builder then automatically accesses each of those programs using such references and changes the address of the variable for each such reference.

In the next step in Sequence B, the Block Builder causes each processor in which a program makes reference to a variable to send a "Requesting Task Request" message to the Processor X which determines the VALUE for the variable (step 38). The user must specify the RATE at the which the VALUE for the variable is to be ascertained or whether the VALUE is to be ascertained only upon the occurrence of a condition, the destination that the variable is to be sent to, and whether any processor is to be notified upon the completion of the access to the VALUE for the variable.

Lastly, if the outcome of the test in step 33 is that a variable name is not the first occurrence in the current processor, a step identical to step 36 is performed, adding a reference to the occurrence into the symbol table (step 40).

Figure 3:
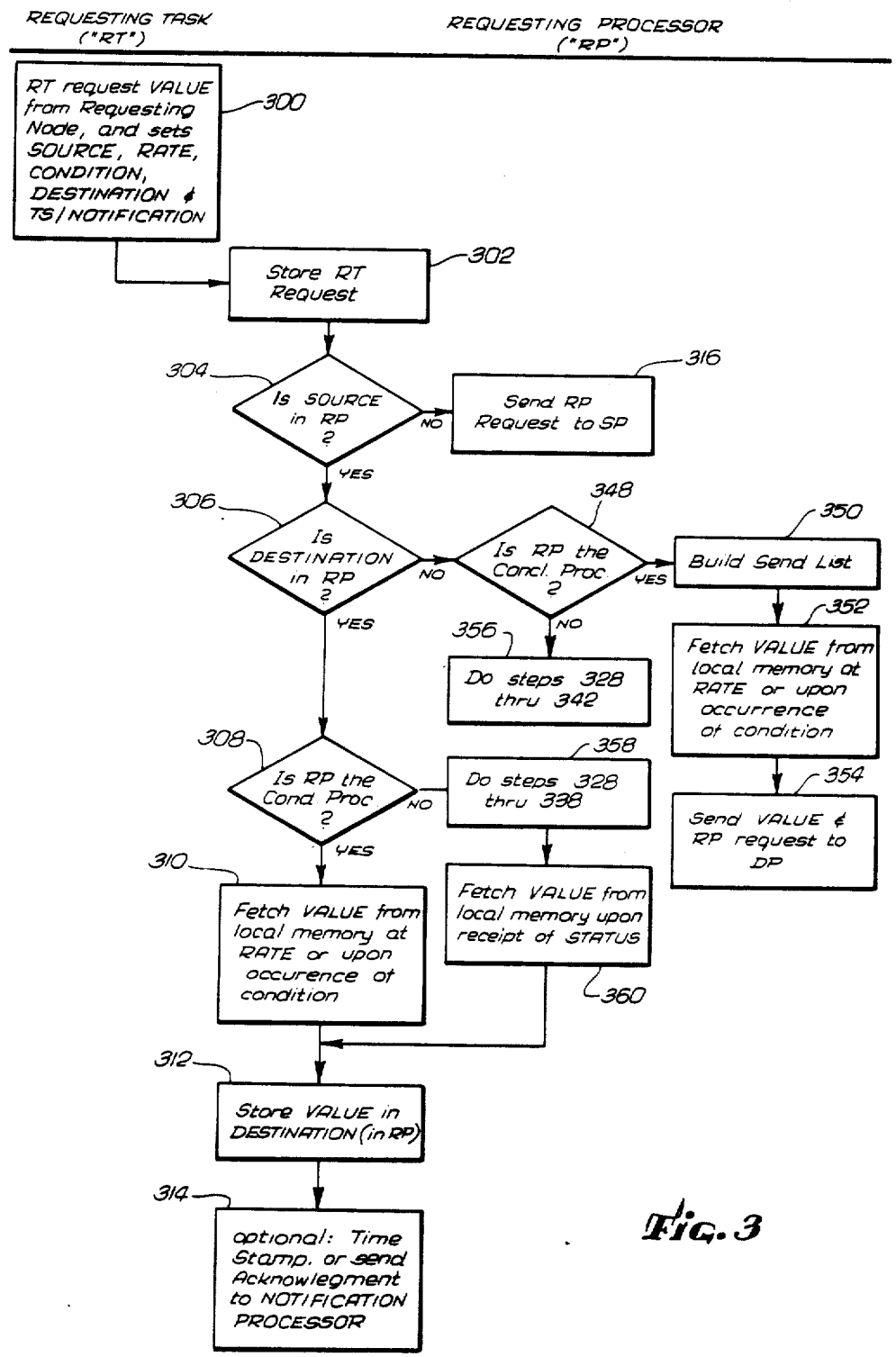
FIG. 3 is a flow-chart of a first part of the Real-Time Data Management procedure of the present invention.
Figure 4:
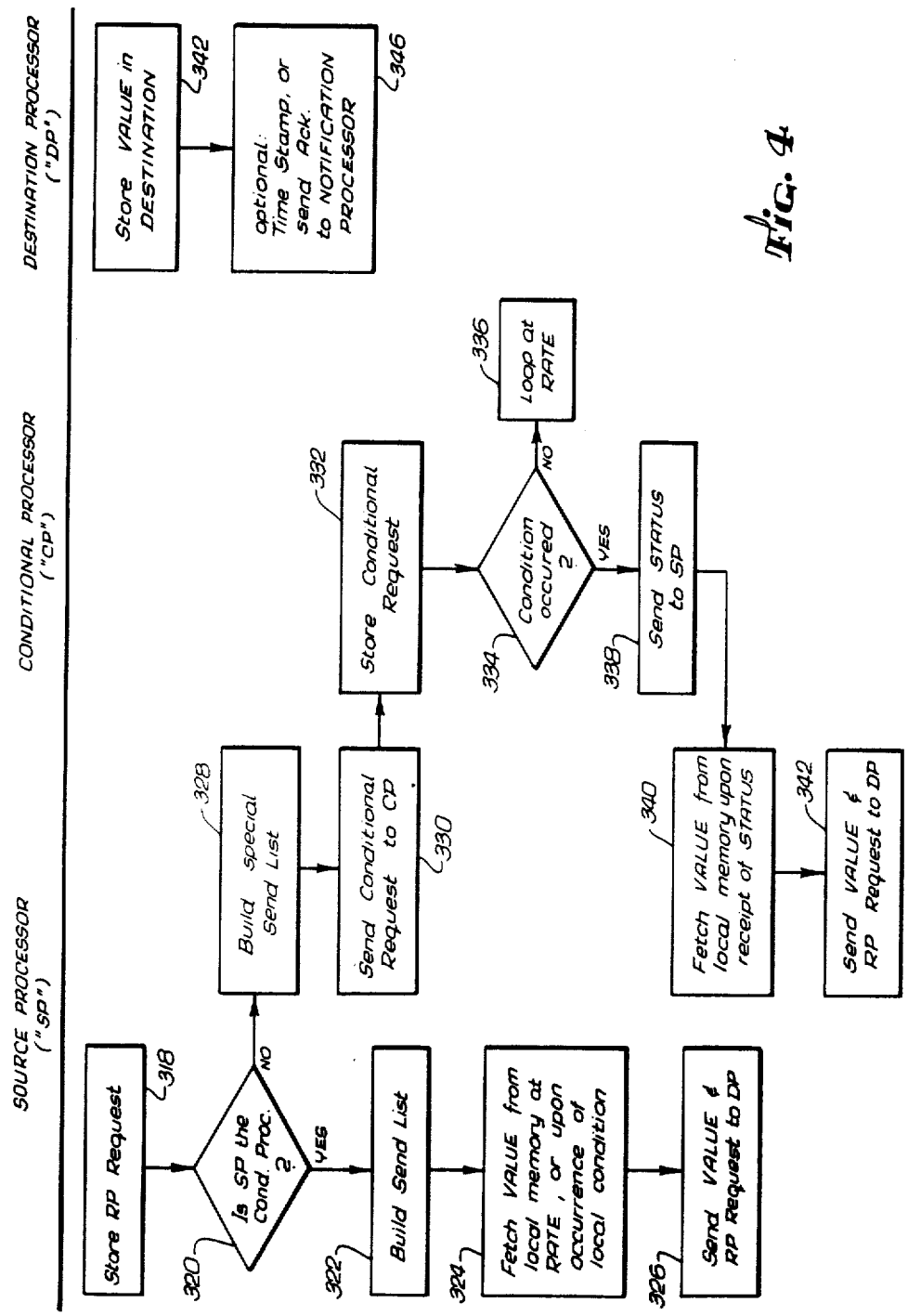
FIG. 4 is a flow-chart of a second part of the Real-Time Data Management procedure of the present invention.

After the Block Builder procedure sets up the basic structure of storage allocation in each local processor for a copy of each variable to be accessed by that processor, together with absolute address references to the processor in which the VALUE of each variable is determined, control over the real-time data base management system is governed by the RTDM procedure, outlined in FIGS. 3 and 4. Each local processor has resident a copy of the RTDM procedure.

Basically, up to five different types of nodes may exist under the RTDM procedure. A Requesting Processor is a local processor that initiates a request for the current VALUE of a variable. A Source Processor is the local processor in which the VALUE for the variable is actually determined (for example, the value of a variable named TEMP may be determined in a local processor that records the output of a thermal sensor).

A third type of node is a Conditional Processor, in which a flag or status bit may be set upon the occurrence of a particular condition (for example, when the temperature or pressure of a particular point in the manufacturing process exceeds a defined value).

A fourth type of node is a Destination Processor, where the value from the Source Processor is to be sent. The fifth type of node is a Notification Processor, where an acknowledgment signal may be sent by the Destination Processor to indicate receipt of the current VALUE for the variable.

Virtually any combination of the above node types may be combined under the RTDM procedure to effectuate maximum flexibility in user application programming. For example, a Requesting Processor can seek the VALUE of a variable from a second (or Source) processor upon the occurrence of a user-defined condition in a third (or Conditional) processor. The value of the variable may then be sent to a fourth (or Destination) processor, with an acknowledgment of receipt signal being sent to a fifth (or Notification) processor. However, one or more local processors may serve in multiple roles. For example, the Requesting Processor will often also be the Destination Processor.

In operation, a user program, or Requesting Task ("RT"), will request the VALUE for a variable from the RTDM procedure in the processor in which the user program resides (step 300). The RT Request will specify the absolute address (or SOURCE) of the memory location containing the VALUE of the variable in the Source Processor which determines that VALUE. The RT Request optionally may designate the RATE at which the VALUE of the variable is to be fetched, or a Conditional Processor (by means of a CONDITION indicator) in which the occurrence of a defined condition will cause the Source Processor to fetch the VALUE of the variable.

The RT Request will also designate (by means of a DESTINATION indicator) the Destination Processor to which the fetched VALUE is to be sent. The Destination Processor may be identical to the Requesting Processor. As a further option, the RT Request may indicate (by means of the TS/NOTIFICATION indicator) that the Destination Processor is to "time stamp" the received VALUE to indicate when the VALUE was received as a check on the requesting process, or the RT Request may indicate a Notification Processor to which the Destination Processor must send an acknowledgment message upon the receipt of the fetched VALUE.

The RT Request is stored in the Requesting Processor (step 302) for purposes of system reliability in the event that all or part of the RT Requests throughout the system must be reissued (for example, when a portion of the system has failed).

The Requesting Processor examines the RT Request to determine if the SOURCE of the VALUE for the variable is in the Requesting Processor (step 304). If so, the RT Request is tested to determine if the DESTINATION of the VALUE is in the Requesting Processor (step 306). If so, a third test determines whether a condition must be met and whether the Requesting Processor is also the Conditional Processor (step 308). If no condition must be met, or if the Requesting Processor is also the Conditional Processor, then the Requesting Processor fetches the current VALUE from its local memory at the RATE specified in the RT Request, or upon the local occurrence of the user-defined condition (step 310). The Requesting Processor then stores the VALUE in the local memory location specified in the DESTINATION indicator of the RT Request (step 312). If the TS/NOTIFICATION indicator has been set in the RT Request, then at the user's selection either the time at which the VALUE was stored is saved along with the VALUE, or an acknowledgment message is sent to the Notification Processor whose address is specified in the TS/NOTIFICATION indicator (step 314).

If the source of the VALUE is determined to be in a different processor as a result of the test in step 304, then an RP Request is sent to the Source Processor indicated by the SOURCE address (step 316). The RP Request contains the absolute system address of the variable desired, the information specified in the original RT Request, and a Request ID that uniquely identifies the particular RP Request and the Requesting Processor, for reference purposes.

The Source Processor receives and then stores the RP Request for purposes of system reliability (step 318, FIG. 4).

The RP Request is then tested to determine whether a condition must be met, and if so whether the Source Processor is the Conditional Processor. (Step 320). If no condition must be met, or if the Source Processor is also the Conditional Processor, then the Source Processor builds a "send list" (step 322). The "send list" contains the address of the desired variable and the Request ID.

The Source Processor then fetches the current VALUE of the variable from its local memory at the RATE specified in the RP Request, or upon the local occurrence of the user-defined condition (step 324). The VALUE, along with the RP Request, is then sent to the Destination Processor specified in the RP Request (step 326).

If the outcome of the test in step 320 is that a condition is specified, and the Source Processor is not the Conditional Processor, then the Source Processor builds a special "Send List" (step 328). The special Send List includes the information in the regular Send List plus the absolute address of the condition in the Condition Processor, and a RATE at which the condition status is to be checked.

After the special Send List is built, the Source Processor sends a Conditional Request to the Conditional Processor (step 330). The Conditional Processor stores the Conditional Request (step 332), and then tests for the occurrence of the condition (step 334) at the RATE specified by the user (step 336). When the condition occurs, the Conditional Processor sends a STATUS flag or message to the Source Processor (step 338). The Source Processor then fetches the current VALUE of the variable from its local memory (step 340), and sends the VALUE and the RP Request on to the Destination Processor (step 342).

Upon receipt of a VALUE of a variable and an RP Request, the Destination Processor stores the VALUE in the location specified by the DESTINATION indicator in the RP Request (step 344). If the TS/NOTIFI- CATION indicator has been set in the RP Request, then at the user's selection either the time at which the VALUE was stored is saved along with the VALUE, or an acknowledgment message is sent to the Notification Processor whose address is specified in the TS/NOTIFICATION indicator (step 346).

If, as a result of the test in step 306, the Requesting Processor determines that the VALUE is locally stored, but its DESTINATION is in another processor, then the RT Request is further tested to determine whether a condition must be met, and if so whether the Requesting Processor is the Conditional Processor (step 348). If so, then the Requesting Processor causes a "send list" to be built (step 350), the VALUE fetched from local memory at the RATE specified or upon the local occurrence of the condition (step 352), and the VALUE and RP Request to be sent to the Destination Processor (step 354).

If, as a result of the test in step 348, the Requesting Processor determines that it is not the Conditional Processor, then the equivalent of steps 328 through 338 are performed by the Requesting Processor and the Conditional Processor (step 356). This causes the VALUE locally stored in the Requesting Processor to be fetched upon the occurrence of a condition in the Conditional Processor, and then sent to the Destination Processor.

Lastly, if, as a result of the test in step 308, the Requesting Processor determines that the VALUE is locally stored and has a local destination, but that the Requesting Processor is not the Conditional Processor, then the equivalent of steps 328 through 338 are performed by the Requesting Processor and the Conditional Processor (step 358). This causes the Conditional Processor to send a STATUS flag or message to the Requesting Processor. Upon receipt of the STATUS flag, the Requesting Processor fetches the current VALUE of the variable from its local memory (step 360). The Requesting Processor will then perform a procedure equivalent to steps 312 and 314 as previously described.

The RTDM procedure thus permits an extremely flexible data base management system that uniquely provides for improved performance in a real-time distributed processing system. Processing speed is enhanced by the fact that each application program uses absolute addresses for all references to memory in its processor, and the RTDM procedure similarly uses absolute addresses into the Source Processor for a variable when obtaining a current copy of the variable's VALUE. Maintainability of the system is enhanced by the use of a master symbol table containing references to the absolute address of each program statement referring to each variable. Reliability is enhanced by completely specifying a request for the current VALUE of a variable and storing that request in each pertinent processor. Moreover, system communications overhead and local memory requirements are reduced by only storing in each processor copies of those variables actually used in the processor.

While a wide variety of other procedures and additional procedures can be used in the invention, it should be understood that changes can be made without departing from the spirit or scope of the invention. Thus, this invention is not to be limited to the specific embodiment discussed and illustrated herein, but rather by the following claims.

What is claimed:

1. In a system having
   local processors each connected to a located memory,
   a communications channel between the local processors, and
   a data base of a multiplicity of data varibles distributed over the local memories,
   an improvement to a method of operating a Distributed Data Base Management System (DDBMS) by
   executing at the local processors local programs, which are
   referencing the data variables within the data base, and
   originating each data variable at an originating one of the local processors,
   the improvement to the method of operating a DDBMS comprising:
   first locally storing in each local memory an original of each data variable which is originated by the associated local processor;
   second locally storing in each local memory a copy, obtained across the communication channel, of each data variable not originated by the associated local processor which each data variable is at any time referenced by the associated local processor;
   WHEREIN both the first and second locally storing of each data variable is at an absolute address, meaning an address designation of the local processor which does originate the data varible in addition to an address in local memory at which the data variable is first locally stored;
   referenceing, responsive to a local program executing on each local processor which local program makes references to data variables, each data variable only at the absolute address of said data variable
   supplying, responsive to said referencing, each data variable from the assoicated memory of the local processor making reference, regardless that the data variable should be the original or the copy;
   executing a procedure within each local processor, called by the local program executing therein, for updating the copy of a data variable stored within the associated local memory by obtaining the original of the data variable across the communication channel.

2. The improvement to the method of operating a DDBMS of claim 1 wherein said executing a procedure further comprises:
   selectively executing said procedure conditionally upon the occurrence of a designated condition at a designated one of said local processors, including at the local processor executing the procedure or at the local processor which does uniquely originate the data variable.

3. The improvement to the method of operating a DDBMS of claim 1 wherein said executing a procedure further comprises:
   executing a procedure at said local program specifiable rate.

4. The improvement to the method of operating a DDBMS of claim 1 which is further comprising, as a last step following said executing a procedure:
   time stamping the updated local copy of the data variable obtained by the execution of said procedure.

5. The improvement to the method of operating a DDBMS to claim 1 which is further comprising, as a last step following said executing a procedure:

acknowledging to a designated one local processor, which designated one local processor may be any of the local processors, that updating of the local copy of the data variable has occurred.

6. The improvement to the method of operating a DDBMS of claim 1 wherein said executing a procedure further comprises:

executing said procedure within each local processor, called by the local program executed therein, for updating the local copy of a specified data variable at a designated one of said local processors, which designated one of said local processors may be any local processor including the local processor executing the procedure or the local processor which does originate the data variable.

7. In a system having a main processor local processing nodes each having a local processor and a local memory connected to said local processor, a communications channel interconnecting the main processor and all local processing nodes, and a data base of variables distributed over the local memories of all the local processing nodes;

a method of operating the system as a Distributed Data Base Management System (DDBMS) for the purposes of minimizing the size of each memory by having as variables stored therein only those originated and-/or referenced by the associated local processor, and minimizing communications on the communications channel of variables referenced for use by local processors through satisfying processor references from local memory, otherwise updating locally stored variable values across the communications bus responsive to local processor execution of an update procedure;

the method of operating a DDBMS having prerequisite steps performed at compile time before run time, and steps performed at run time;

the method of operating a DDBMS comprising:

executing, by said main processor communicating with the local processing nodes across the communications channel, at compile time before run time a Block Builder procedure comprising generating a variable symbol table in the main processor which lists for all variables used throughout the DDBMS (1) a variable name, and (2) an absolute address of the variable which absolute address contains both the identity of the single local processing node which does originate the variable value plus the location within the local memory of said single local processing node wherein said variable value will be stored, further allocating storage for each variable in the local memory of (1) the local processing node which does originate the value of each variable, and (2) all other local processing nodes which reference each variable, for all variables used throughout the DDBMS, further causing each said other local processing nodes which reference each variable to made a Requesting Task Request to the local processing node which does originate the value of the variable in order that the variable value becomes stored in the local memory of each other local processing node which will reference the variable; and executing, by the local processor of each local processing node communicating with other local processing nodes across the communications channel, at run time a Real Time Data Management (RTDM) procedure for the updating of data variable values, said RTDM procedure comprising requesting, responsive to a user program executed by a local processor making reference to a variable, the value of the variable at its absolute address, WHEREIN IF the local processor making reference is within that single local processing node which originates the variable value THEN supplying the value of the variable to the local processor making reference from the associated local memory ELSE IF the local processor making reference is not within that local processing node which originates the variable value THEN supplying the value of the variable to the local processor making reference from the memory of the local processing node which does originate the value of the variable by communicating the value across the communications channel.

8. The method of operating a DDBMS of claim 7 wherein within said RTDM procedure said requesting is further comprising:

requesting conditionally upon an occurrence of a designated condition at a designated one of the processing nodes, occurrence of the designated condition being determined IF the local processor making reference is within the designated one of the processing nodes THEN determining the designated condition internally within the local processor making reference ELSE IF the local processor making reference is not within the designated one of the processing nodes THEN determining the designated condition by communication between said local processor making reference and the designated one of the processing nodes across said communications channel.

9. The method of operating a DDBMS of claim 7 wherein said requesting is further comprising:

requesting the value of the variable to be supplied at a designated rate;

and wherein said supplying is:

done at said designated rate.

10. The method of operating a DDBMS of claim 7 wherein said RTDM procedure is further comprising as a last step following said supplying:

time stamping at the local processor making reference the value of the variable received, whereby a check on the process of the value of variables supplying is made.

11. The method of operating a DDBMS of claim 7 wherein said RTDM procedure is further comprising as a last step following said supplying:

acknowledging to a designated notification processor, which may be the local processor, the receipt of said variable value in response to said supplying.

12. In a system having a main processor local processing nodes each having a local processor and a local memory connected to said local processor, a communications channel interconnecting the main processor and all local processing nodes, and a data base of variables distributed over the local memories of all the local processing nodes;

a method of operating the system as a Distributed Data Base Management System (DDBMS) for the purposes of minimizing the size of each memory by having as variables stored therein only those originated and/or referenced by the associated local processor, and minimizing communications on the communications channel of variables referenced for use by local processors through satisfying processor references from local memory, otherwise updating locally stored variable values across the communications bus responsive to local processor execution of an update procedure;

the method of operating a DDBMS having prerequisite steps performed at compile time before run time, and steps performed at run time;

the method of operating a DDBMS comprising:

executing, by said main processor communicating with the local processing nodes across the communications channel, at compile time before run time a Block Builder procedure comprising generating a variable symbol table in the main processor which lists for all variables used throughout the DDBMS (1) a variable name, and (2) an absolute address of the variable which absolute address contains both the identity of the single local processing node which does originate the variable value plus the location within the local memory of said single local processing node wherein said variable value will be stored, further allocating storage for each variable in the local memory of (1) the local processing node which does originate the value of each variable, and (2) all other local processing nodes which reference each variable, for all variables used throughout the DDBMS, further causing each said other local processing nodes which reference each variable to make a Requesting Task Request to the local processing node which does originate the value of the variable in order that the variable value becomes stored in the local memory of each other local processing node which will reference the variable; and executing, by the local processor of each local processing node communicating with other local processing nodes across the communications channel, at run time a Real Time Data Management (RTDM) procedure for the updating of data variable values, said RTDM procedure comprising requesting, responsive to a user program executed by a local processor making reference to a variable, the value of the variable at its absolute address be sent to a designated one destination local processor, which destination local processor may be identical to the local processor making reference;

IF the local processor making reference is within that local processing node which does originate the variable value THEN supplying the value of the variable to said destination processor, across said communications channel if necessary because the destination processor is not identical to the processor making reference, ELSE IF the local processor making reference is not within that local processing node which does originate the variable value THEN communicating said requesting across the communications channel to the local processing node which does originate the value of the variable AND supplying, from the memory of the single local processing node which does originate the value of the variable, the value of the variable to said destination processor, across said communications channel if the destination processor is not identical to that local processor within the local processing node.

13. The method of operating a DDBMS of claim 12 wherein said RTDM procedure is further comprising as a last step following said supplying:

time stamping at the local processor making reference the value of the variable received, whereby a check on the process of the value of variables supplying is made.

14. The method of operating a DDBMS of claim 12 wherein said requesting is further comprising:

requesting the value of the variable to be supplied at a designated rate;

and wherein said supplying is further comprising:

supplying at the designated rate.

15. The method of operating a DDBMS of claim 12 wherein said RTDM procedure said requesting is further comprising:

requesting conditionally upon the occurrence of a designated condition at a designated one of the processing nodes, said defined condition being determined IF the local processor making reference is within the designated one of the processing nodes THEN determining the designated condition internally within the local processor making reference ELSE IF the local processor making reference is not within the designated one of the processing nodes THEN determining the designated condition by communication between the cocal processor making reference and the designated one of the plurality of processing nodes across the communications channel.

16. The method of operating a DDBMS of claim 12 wherein said RTDM procedure is further comprising as a last step following said supplying:

acknowledging to a designated notification processor, which may be the local processor making reference, the receipt of the variable value responsively to the supplying.

* * * * *